United States Patent [19]
Smith et al.

[11] 4,132,181
[45] Jan. 2, 1979

[54] FERTILIZER APPLYING KNIFE ASSEMBLY

[75] Inventors: Donald D. Smith; Otis L. Davis, III; Richard Heiniger, all of Colby, Kans.

[73] Assignee: Ace Service Incorporated, Colby, Kans.

[21] Appl. No.: 799,393

[22] Filed: May 23, 1977

[51] Int. Cl.² .......................................... A01C 23/02
[52] U.S. Cl. ........................................ 111/7; 172/719
[58] Field of Search ................ 111/6, 7, 86; 172/699, 172/719, 724, 745, 76; 37/141 R, 142 R, 193

[56] References Cited

U.S. PATENT DOCUMENTS

| | | | |
|---|---|---|---|
| 2,598,121 | 5/1952 | Hannibal | 172/699 X |
| 2,781,733 | 2/1957 | Graham | 111/7 |
| 2,843,066 | 7/1958 | Dugan | 111/7 |
| 2,849,970 | 9/1958 | Coberly et al. | 111/7 |
| 3,014,293 | 12/1961 | Boatman et al. | 37/141 R |
| 3,259,087 | 7/1966 | Horton | 172/719 X |
| 3,326,152 | 6/1967 | Frantzen | 172/699 X |
| 3,439,636 | 4/1969 | Lemke | 111/7 |
| 4,033,271 | 7/1977 | Williams et al. | 172/724 X |

FOREIGN PATENT DOCUMENTS

| | | | |
|---|---|---|---|
| 200637 | 4/1955 | Australia | 111/7 |
| 785825 | 11/1957 | United Kingdom | 172/719 |

*Primary Examiner*—Edgar S. Burr
*Assistant Examiner*—James R. Feyrer
*Attorney, Agent, or Firm*—Fishburn, Gold & Litman

[57] ABSTRACT

A fertilizer knife assembly is capable of being connected to an agricultural implement and is operative for flow of fertilizer into a furrow opened by the knife assembly. A wear point of cast chrome alloy iron has a leading portion and a shoe portion in engagement with and secured by welding to a leading edge and a free end respectively of an elongated shank capable of being connected to an agricultural implement. An elongated fertilizer tube is positioned adjacent a trailing edge of the shank and has one end portion thereof secured to a trailing end of the shoe portion of the wear point. An elongated shield is spaced from and surrounds an exterior surface of the fertilizer tube and has opposite side edges thereof secured to the shank trailing edge by hard facing welding in a manner to protect the fertilizer tube and define an air space surrounding the same.

7 Claims, 5 Drawing Figures

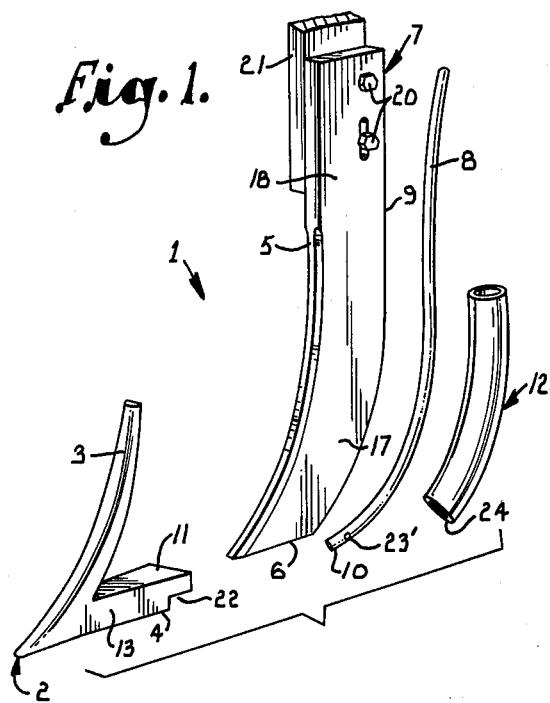
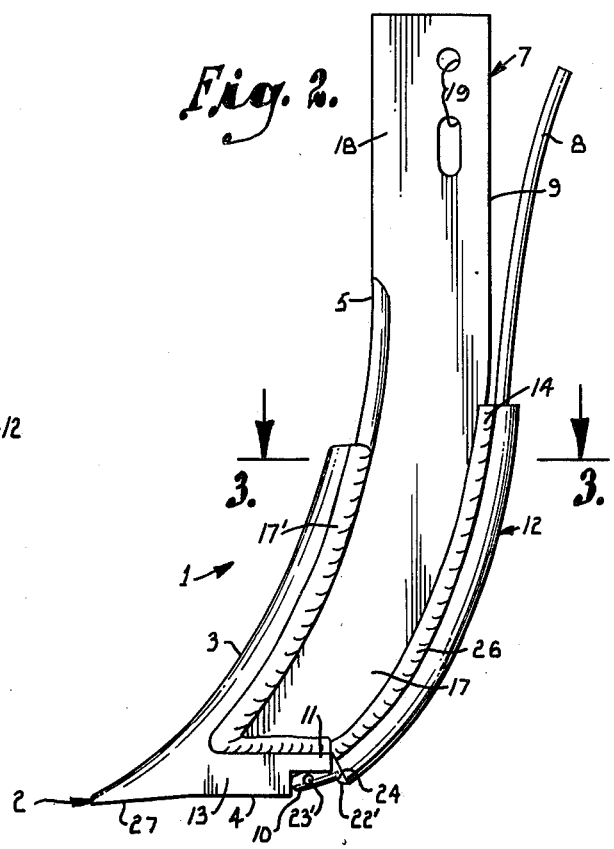
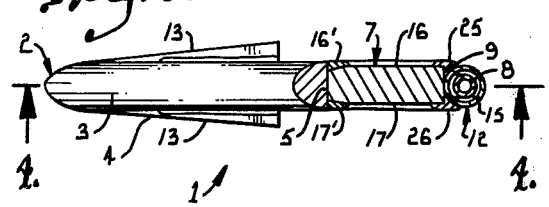
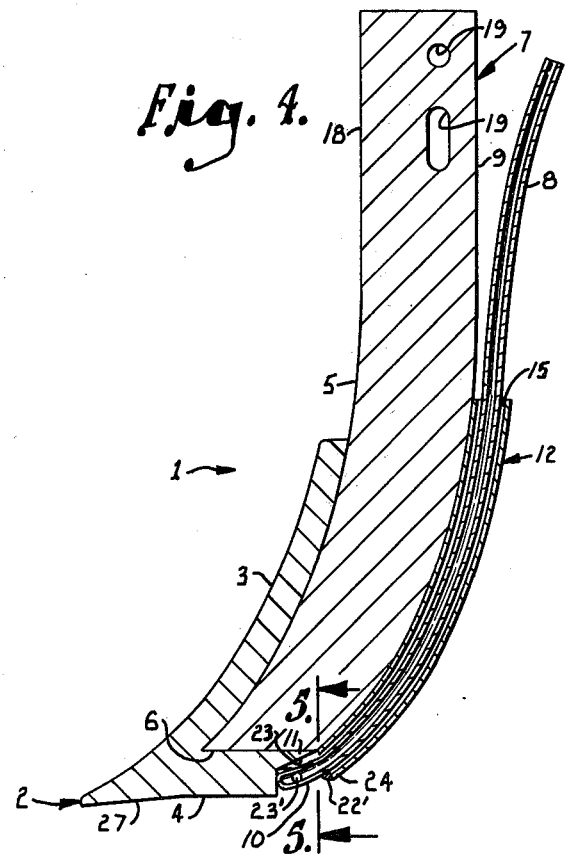
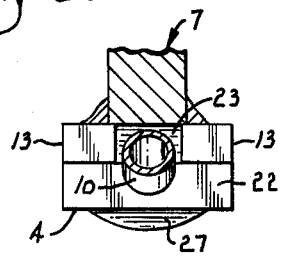

FERTILIZER APPLYING KNIFE ASSEMBLY

The present invention relates to fertilizer applying knife assemblies and more particularly to a long wearing knife assembly having one end of an elongated fertilizer tube secured to a shoe portion of a wear point and having a shield positioned to define an air space surrounding the fertilizer tube.

The principal objects of the present invention are: to provide a long wearing fertilizer applying knife assembly capable of being connected to an agricultural implement and operative for flow of fertilizer into a furrow opened by the fertilizer applying knife assembly; to provide such a knife assembly having an elongated shield surrounding and spaced from an exterior surface of a fertilizer tube to define an air space surrounding the fertilizer tube; to provide such a knife assembly wherein an end portion of the fertilizer tube is secured within a recess in a trailing end of a shoe portion of a wear point of cast high chrome alloy iron mounted on and welded to an elongated shank connected to the agriculteral implement; to provide such a knife assembly wherein a leading portion and a shoe portion of the wear point have a greater thickness than the shank and are welded thereto in a manner so that the welds are protected by the greater thickness of the wear point; to provide such a knife assembly wherein the shield has leg portions secured to the shank by hard facing welds which each extend outwardly from the shank and the shield so that the shield is protected by the thickness of the hard facing weld; and to provide such a fertilizer applying knife assembly which is durable in construction, positive in operation, economical to manufacture, and particularly well adapted for the proposed use.

Other objects and advantages of this invention will become apparent from the following description taken in connection with the accompanying drawing wherein are set forth, by way of illustration and example, certain embodiments of this invention.

The drawings constitute a part of the specification and include an exemplary embodiment of the present invention and illustrate various objects and features of the fertilizer applying knife assembly.

FIG. 1 is an exploded perspective view of a fertilizer applying knife assembly embodying features of the present invention.

FIG. 2 is a side elevational view of the fertilizer applying knife assembly.

FIG. 3 is a transverse sectional view through the fertilizer applying knife assembly and taken on line 3—3 of FIG. 2.

FIG. 4 is a longitudinal sectional view through the fertilizer applying knife assembly and taken on line 4—4 of FIG. 3.

FIG. 5 is a transverse sectional view through the shank and shoe taken on the line 5—5 of FIG. 4.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a fertilizer applying knife assembly capable of being connected to an agricultural implement and which is operative for flow of fertilizer into a furrow opened by the knife assembly 1. A wear point 2 has a leading portion 3 and a shoe portion 4 in engagement with and secured to a leading edge 5 and a free end 6 respectively of an elongated shank 7 which is capable of being connected to an agricultural implement. An elongated fertilizer tube 8 is positioned adjacent a trailing edge 9 of the shank 7 and has one end portion 10 thereof secured adjacent a trailing end 11 of the shoe portion 4 of the wear point 2. An elongated shield 12 is spaced from and surrounds an exterior surface of the fertilizer tube 8. The shield 12 is illustrated as a tube surrounding the tube 8 and engaging the shank trailing edge 9 and secured thereto by welding of hard facing 14 on each side in a manner to resist wear of the shield tube and to define an air space 15 surrounding fertilizer tube 8.

The shank 7 is an elongated planar member having opposite side surfaces 16 and 17. An upper end portion 18 of the shank 7 has a plurality of suitable apertures and/or slots 19 therein adapted to receive suitable bolts 20 for securing the shank 7 to a standard 21 depending from the agricultural implement (not shown). The shank 7 is preferably arcuate in a forwardly direction from the standard 21 as best seen in FIGS. 2 and 4. The shank 7 is preferably formed of a conventional mild steel alloy which is not damaged by welding.

The wear point 2 is formed of a hard long wearing material, such as cast high chrome alloy iron. Such a material has been used for the digger teeth and crusher rollers in rock crushers. The wear point 2 is generally V-shaped when viewed from one side thereof, as best seen in FIGS. 2 and 4. The leading portion 3 of the wear point 2 is in engagement with the leading edge 5 of the shank 7 and the shoe portion 4 of the wear point 2 is in engagement with the free end 6 of the shank 7.

The shoe portion 4 has sides 13 which diverge rearwardly so the trailing end 11 of the shoe portion 4 is substantially wider than the leading point. The trailing end has a recess or downwardly and rearwardly opening groove 22 to receive therein the one end portion 10 of the fertilizer tube 8. The end of the shield tube 12 engages the rear or trailing end of the shoe and the end of the fertilizer tube portion 10 is secured in position by welding as at 22'. The lower portion of the trailing end of the shoe is notched or cut away as at 23 to permit discharge of the fertilizer or ammonia into the soil through discharge ports 23' in the tube 8. The weld at 22' holds the tube 8 in place until it needs replacing, at which time the weld is ground off, a new tube inserted and weld at the same spot.

The wear point leading portion 3 and shoe portion 4 each have a transverse thickness greater than a transverse thickness of the shank 7 whereby the shank leading edge 5 and the free end 6 are protected from abrasion or impact of soil, roots, rocks, and the like. The wear point leading portion 3 and the shoe portion 4 are secured by welds 16' and 17' to the opposite side surfaces 16 and 17 adjacent the shank leading edge 5 and free end 6 respectively whereby the welds 16' and 17' are protected by the greater thickness of the wear point portions 3 and 4. The welds 16' and 17' are preferably mild steel welds and form a good bond with the shank 7 and the wear point 2.

The fertilizer tube 8 includes a substantially rigid portion positioned adjacent and spaced from and in trailing relation with the shank trailing edge 9. The fertilizer tube one end portion 10 is received within the groove 22 and extends to the forward portion of the notch at 23. The fertilizer tube end portion 10 has diametrically opposed discharge ports 23' therein for outwardly flow of fertilizer therefrom and into a furrow opened by the wear point 2 and the shank 7. The wing formed in the shoe by the greater width at the trailing portion, groove 22 and notch at 23 provides protection for the tube 8 and tends to trap the fertilizer during application reducing loss into the atmosphere. The fertilizer tube has a diameter or transverse dimension which is less than the transverse thickness of the shank 7. The fertilizer tube 8 is preferably formed of a substantially rigid material, such as steel, which will remain in position adjacent the shank trailing edge 9.

The shield 12 is an elongated tube member spaced from an exterior surface of and surrounding the fertilizer tube 8 in a manner to define an air space 15 surrounding the fertilizer tube 8. The shield 12 has one end 24 thereof substantially engaging the trailing end 11 of the wear point shoe portion 4 fertilizer tube 8 extends beyond the end 24 so that fertilizer may flow outwardly through the discharge ports 23 into a furrow opened by the wear point 2 and the shank 7. The shoe has a lowermost, substantially flat face 27 which is inclined upwardly and rearwardly from the rounded point to a medial portion of the shoe, and is generally horizontal therefrom to the groove 22.

The illustrated shield tube 12 preferrably has a diameter not greater than the thickness or width of the shank 7 so the sides of the tube 12 are inwardly relative to the shank side surfaces 16 and 17 respectively. The shield engages the rear edge of the shank 7 and is secured thereto by hard facing welds 25 and 26 each of which extend along the length of and rearwardly from adjacent a respective one of the shank side surfaces 16 and 17 to respective of the exterior side portions of the shield tube whereby the shield 12 is protected from abrasion and impact, as by roots, soil, rocks, and the like, by the shank and the thickness of the hard facing welds 25 and 26.

The shield 12 is preferably formed of a substantially rigid material, such a steel, which will retain its shape when in use thereby maintaining the air space 15 surrounding the fertilizer tube 8. The shield 12 is also preferably formed of a material which will not be damaged by welding to the shank 7 by the hard facing welds 25 and 26.

The fertilizer applying knife assembly 1 is particularly adapted for application of a liquid fertilizer which becomes gaseous upon vaporization by expansion into the fertilizer tube 8. The expansion causes the fertilizer tube 8 to become quite cold and to freeze. The air space 15 within the shield 12 insulates the shank 7 from the cold fertilizer tube 8 and thereby substantially eliminates freeze-up of the shank 7. When the shank 7 is prevented from freezing then the wear point 2 is also protected from freezing, whereby the wear point 2 opens a furrow only of the width desired and thereby substantially reduces the possibility of escape of the gaseous fertilizer from an overly large furrow.

It is to be understood that while we have illustrated and described one form of our invention, it is not to be limited to the specific form or arrangement of parts herein described and shown.

What we claim and desire to secure by Letters Patent is:

1. A fertilizer applying knife assembly comprising:
   (a) an elongated shank capable of being connected to an agricultural implement and having a leading edge and a trailing edge, said shank being a planar member of steel and having opposite side surfaces and a face end;
   (b) a wear point of cast high chrome alloy iron and having a leading portion in engagement with said shank leading edge and a shoe portion in engagement with said shank free end;
   (c) said wear point leading portion and shoe portion having a thickness greater than the thickness of said shank;
   (d) said wear point leading portion and shoe portion being welded along the length thereof to said shank leading edge and free end respectively with the greater thickness of the wear point portions protecting said welds;
   (e) an elongated fertilizer tube spaced from and in trailing relation to said shank trailing edge and having one end portion with discharge ports adjacent said wear point shoe, said fertilizer tube having a transverse dimension less than the thickness of the shank; and
   (f) an elongated shield in trailing relation to said shank trailing edge and secured thereto by welding, said shield and shank defining an elongated enclosure for said fertilizer tube extending to adjacent the discharge ports thereof.

2. A fertilizer applying knife assembly comprising:
   (a) an elongated shank capable of being connected to an agricultural implement and having a leading edge and a trailing edge, said shank having a free end;
   (b) a wear point of cast high chrome alloy iron having a leading portion in engagement with said shank leading edge and a shoe portion in engagement with said shank free end both being secured by welding thereto, said wear point shoe portion having a trailing end portion wider than a leading portion thereof, said trailing end portion having a downwardly and rearwardly opening notch forming lateral wings;
   (c) an elongated fertilizer tube spaced from and in trailing relation with said shank trailing edge and having an end of one end portion thereof downwardly into said notch below said wings, said fertilizer tube one end portion having discharge ports therein located in said notch for outwardly flow of fertilizer therefrom, said fertilizer tube having a transverse dimension less than a thickness of said shank; and
   (d) an elongated shield spaced from an exterior surface of and surrounding said fertilizer tube and having opposite side portions thereof secured to said shank trailing edge in a manner to define an air space surrounding said fertilizer tube, said shield having one end thereof substantially engaging said trailing end of said wear point shoe portion so that said fertilizer tube discharge ports are operative for flow of fertilizer into a furrow opened by said wear point.

3. A fertilizer applying knife assembly as set forth in claim 2 wherein:
   (a) said shank is a planar member having opposite side surfaces;

(b) said shield is generally tubular with a diameter not greater than the thickness of the shank and engages a trailing edge of said shank; and (c) said shield being secured to said shank by respective hard facing welds each extending along the length of and rearwardly from said shank opposite side surfaces to sides of said shield whereby said shield is protected by the thickness of said hard facing welds.

4. A fertilizer applying knife assembly as set forth in claim 3 wherein:

(a) said wear point leading portion and shoe portion have a thickness greater than a thickness of said shank; and (b) said wear point leading portion and shoe portion are welded along the length thereof to said shank leading edge and free end respectively whereby the welds are protected by the greater thickness of said wear point.

5. A fertilizer applying knife assembly comprising:

(a) an elongated shank capable of being connected to an agricultural implement and having a leading edge and a trailing edge, said shank having a free end, said shank being a planar member having opposite side surfaces;

(b) a wear point having a leading portion in engagement with said shank leading edge and a shoe portion in engagement with said shank free end and secured by welding thereto;

(c) an elongated fertilizer tube adjacent said shank trailing edge and having one end portion thereof secured to said wear point shoe portion, said fertilizer tube having discharge ports in said one end portion thereof for outwardly flow of fertilizer therefrom;

(d) an elongated shield spaced from an exterior surface of and surrounding said fertilizer tube and having opposite side portions thereof secured to said shank trailing edge in a manner to define an air space surrounding said fertilizer tube, said shield having one end thereof spaced from said wear point shoe portion so that said fertilizer tube discharge ports are operative for flow of fertilizer into a furrow opened by said wear point;

(e) said shield being tubular with a diameter not greater than the width of the shank and engaging a trailing edge of said shank; and (f) said shield being secured to said shank by respective hard facing welds each extending along the length of and rearwardly from adjacent said shank opposite side surfaces to sides of said shield whereby said shield is protected by the thickness of said hard facing welds.

6. A fertilizer applying knife assembly comprising:

(a) an elongated shank capable of being connected to an agricultural implement and having a leading edge and a trailing edge, said shank having a free end, said shank being a planar member having opposite side surfaces;

(b) a wear point having a leading portion in engagement with said shank leading edge and a shoe portion in engagement with said shank free end and secured by welding thereto, said wear point leading portion and shoe portion have a thickness greater than a thickness of said shank;

(c) said wear point leading portion and shoe portion being welded along the length thereof to said opposite side surfaces adjacent said shank leading edge and free end respectively whereby the welds are protected by the greater thickness of said wear point portions;

(d) an elongated fertilizer tube adjacent said shank trailing edge and having one end portion thereof secured to said wear point shoe portion, said fertilizer tube having discharge ports in said one end portion thereof for outwardly flow of fertilizer therefrom;

(e) an elongated shield spaced from an exterior surface of and surrounding said fertilizer tube and having opposite side portions thereof secured to said shank trailing edge in a manner to define an air space surrounding said fertilizer tube, said shield having one end thereof spaced from said wear point shoe portion so that said fertilizer tube discharge ports are operative for flow of fertilizer into a furrow opened by said wear point;

(f) said shield being generally tubular with a diameter less than the thickness of the shank and engages a trailing edge of said shank; and (g) said shield being secured to said shank by respective hard facing welds each extending along the length of and rearwardly from adjacent said shank opposite side surfaces to sides of said shield whereby said shield is protected by the thickness of said hard facing welds.

7. A fertilizer applying knife assembly as set forth in claim 6 wherein:

(a) said wear point shoe portion diverges outwardly and rearwardly and has a trailing end with a downwardly and rearwardly opening notch forming lateral wings and a central groove above said notch;

(b) said fertilizer tube one end portion is received within said wear point groove and the end thereof extends below the wings for protection thereby; and (c) said fertilizer tube being secured to said shield adjacent said one end portion.

* * * * *

UNITED STATES PATENT AND TRADEMARK OFFICE
CERTIFICATE OF CORRECTION

PATENT NO. : 4,132,181
DATED : January 2, 1979
INVENTOR(S) : Donald D. Smith, et al It is certified that error appears in the above—identified patent and that said Letters Patent is hereby corrected as shown below:

Claim 1, line 8, "face" should be --free--; line 24, --portion-- should appear after "shoe".

Signed and Sealed this

Ninth Day of November 1982

[SEAL]

Attest:

GERALD J. MOSSINGHOFF

*Attesting Officer*     *Commissioner of Patents and Trademarks*